(12) United States Patent
Chen et al.

(10) Patent No.: US 8,380,788 B2
(45) Date of Patent: *Feb. 19, 2013

(54) SYSTEM AND METHOD FOR PROVIDING USER CONTEXT SUPPORT IN A NATIVE TRANSACTION PLATFORM

(75) Inventors: Wei Chen, Beijing (CN); Sheng Zhu, Beijing (CN)

(73) Assignee: Oracle International Corporation, Redwood Shores, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/459,447

(22) Filed: Apr. 30, 2012

(65) Prior Publication Data

US 2012/0215840 A1 Aug. 23, 2012

Related U.S. Application Data

(63) Continuation of application No. 12/490,250, filed on Jun. 23, 2009, now Pat. No. 8,190,710.

(51) Int. Cl.
*G06F 15/16* (2006.01)
(52) U.S. Cl. ......... 709/203; 709/217; 709/219; 709/223
(58) Field of Classification Search .................. 709/203, 709/217, 219, 223
See application file for complete search history.

(56) References Cited

U.S. PATENT DOCUMENTS

| | | | |
|---|---|---|---|
| 5,798,769 A | 8/1998 | Chiu et al. | |
| 5,850,221 A | 12/1998 | Macrae et al. | |
| 5,937,163 A | 8/1999 | Lee et al. | |
| 5,953,724 A | 9/1999 | Lowry | |
| 6,128,617 A | 10/2000 | Lowry | |
| 6,154,750 A | 11/2000 | Roberge et al. | |
| 6,259,451 B1 | 7/2001 | Tesler | |
| 6,496,208 B1 | 12/2002 | Bernhardt et al. | |
| 6,732,114 B1 | 5/2004 | Aamodt et al. | |
| 6,816,175 B1 | 11/2004 | Hamp et al. | |
| 6,859,823 B1 | 2/2005 | Nishihara et al. | |

(Continued)

FOREIGN PATENT DOCUMENTS

| | | | |
|---|---|---|---|
| WO | 2005/084285 A2 | 9/2005 | |
| WO | 2007/111951 A2 | 10/2007 | |

(Continued)

OTHER PUBLICATIONS

"AA OrgChart Webpart." at URL: http://www.aasoftech.com/Products/OrgChartwebpart/Default.asp, downloaded Nov. 20, 2008; Copyright 1997-2007, AASoftech Inc, 1 page.

(Continued)

*Primary Examiner* — Frantz Jean
(74) *Attorney, Agent, or Firm* — Kilpatrick Townsend & Stockton LLP

(57) ABSTRACT

According to an embodiment, the present invention provides a computer-readable storage medium comprising processor executable codes. The computer-readable storage medium includes code for receiving information from a client entity at a server entity over a network. The computer-readable storage medium includes code for providing a server process at the service, the server process including one or more process threads. The computer-readable storage medium includes code for providing a first context associated the one or more process threads. The computer-readable storage medium includes code for receiving a user request from the client entity for a user thread, the user thread being associated with the service process. The computer-readable storage medium includes code for generating the user thread at the server entity.

20 Claims, 8 Drawing Sheets

U.S. PATENT DOCUMENTS

| | | |
|---|---|---|
| 6,944,830 B2 | 9/2005 | Card et al. |
| 6,990,638 B2 | 1/2006 | Barksdale et al. |
| 7,080,077 B2 | 7/2006 | Ramamurthy et al. |
| 7,131,069 B1 | 10/2006 | Rush et al. |
| 7,149,959 B1 | 12/2006 | Jones et al. |
| 7,152,207 B1 * | 12/2006 | Underwood et al. ......... 715/207 |
| 7,363,593 B1 | 4/2008 | Loyens et al. |
| 7,412,647 B2 | 8/2008 | Sellers et al. |
| 7,574,659 B2 | 8/2009 | Szabo |
| 7,603,632 B1 | 10/2009 | Aamodt et al. |
| 7,743,077 B2 | 6/2010 | Gaurav |
| 7,802,174 B2 | 9/2010 | Teng et al. |
| 8,161,413 B2 | 4/2012 | Chen et al. |
| 8,190,710 B2 | 5/2012 | Chen et al. |
| 2003/0218640 A1 | 11/2003 | Noble-Thomas |
| 2004/0169688 A1 | 9/2004 | Burdick et al. |
| 2004/0205594 A1 | 10/2004 | Arora et al. |
| 2004/0230917 A1 | 11/2004 | Bales et al. |
| 2005/0050477 A1 | 3/2005 | Robertson et al. |
| 2005/0071765 A1 | 3/2005 | Hallisey et al. |
| 2005/0108260 A1 | 5/2005 | Wenn et al. |
| 2005/0120005 A1 | 6/2005 | Tesch et al. |
| 2005/0165766 A1 | 7/2005 | Szabo |
| 2005/0262192 A1 | 11/2005 | Mamou et al. |
| 2006/0001647 A1 | 1/2006 | Carroll |
| 2006/0150169 A1 | 7/2006 | Cook et al. |
| 2006/0169688 A1 | 8/2006 | Mori et al. |
| 2006/0195575 A1 | 8/2006 | Delany et al. |
| 2007/0011316 A1 | 1/2007 | Araki et al. |
| 2007/0100848 A1 | 5/2007 | Vignet |
| 2007/0174160 A1 | 7/2007 | Solberg et al. |
| 2007/0185904 A1 | 8/2007 | Matsuzawa et al. |
| 2008/0028338 A1 | 1/2008 | Kodosky et al. |
| 2008/0091441 A1 | 4/2008 | Flammer et al. |
| 2008/0162616 A1 | 7/2008 | Gross et al. |
| 2009/0070337 A1 | 3/2009 | Romem et al. |
| 2009/0113350 A1 | 4/2009 | Hibino et al. |
| 2009/0144606 A1 | 6/2009 | Vignet |
| 2009/0164946 A1 | 6/2009 | Liddington |
| 2010/0287512 A1 | 11/2010 | Gan et al. |
| 2010/0325198 A1 | 12/2010 | Chen et al. |
| 2010/0332582 A1 | 12/2010 | Chen et al. |
| 2011/0055755 A1 | 3/2011 | Chen et al. |
| 2011/0055756 A1 | 3/2011 | Chen et al. |
| 2011/0055767 A1 | 3/2011 | Chen et al. |
| 2011/0055768 A1 | 3/2011 | Chen et al. |
| 2011/0055771 A1 | 3/2011 | Chen et al. |

FOREIGN PATENT DOCUMENTS

| | | |
|---|---|---|
| WO | 2008/042677 A2 | 10/2008 |

OTHER PUBLICATIONS

"Chapter 2: A Tutorial Introduction to Leo," at URL: http://web-pages.charter.net.edramleo/intro.html#clones-views, downloaded Nov. 17, 2008, 4 pages.

"Create multiple Views with on one node with paging," Jan. 5, 2008, at URL: http://drupal.org/node/85720, downloaded Nov. 17, 2008, 3 pages.

"Different Context Menus depending on selected Node in Tree View—Xtreme Visual Basic Talk," at URL: http://www.xtremevbtalk.com/showthread.php?t=85288, downloaded Nov. 18, 2008, 3 pages.

Dill et al., "A Continuously Variable Zoom for Navigating Large Hierarchical Networks," at URL: http://ieeexplore.ieee.org/Xplore/login.jsp?url=/iel2/3184/9019/00399869.pdf?temp=x, 1994, 5 pages.

"Discussion Forum: Ittoolbox Groups Regarding to organization chart in asp.net" at URL: http://c.ittoolbox.com/groups/technical-functional/csharp-1/regarding-to-organization-chart-in-aspnet-2191857, downloaded Nov. 20, 2008, Copyright 1998-2008, CEB Toolbox, Inc., 2 pages.

"Global View Mode," http://www.ilog.com/documentation/elixir10/en-US/Content/Visualization/Documentation/Elixir/_pubskel/ps_elixir82.html, downloaded Nov. 20, 2008; Copyright 1987-2008, ILOG S.A, 3 pages.

"Google Organizational Charts," Cogmap, at URL: http://www.cogmap.com/chart/google, downloaded Nov. 13, 2008, 5 pages.

"Grouping Data in a Report" at URL: http://msdn.microsoft.com/en-us/library/ms155903(SQL.90).aspx, downloaded Nov. 20, 2008, Copyright 2008, Microsoft Corporation, 2 pages.

"How to Draw Organizational Charts," EDrawsoft, at URL: http://www.edrawsoft.com/How-to-draw-org-charts.php, Copyright 2004-2008, EDrawSoft downloaded Nov. 13, 2008, 2 pages.

"INAPORT Enterprise Data Integration for GoldMine," at URL: http://www.databridgenow.com/what_we_do/inaport.pdf, InaPlex Limited 2002, 6 pages.

"InfoPath Team Blog: recursive Controls support in Infopath," 2003 SP1 at URL: http://blogs.msdn.com/infopath/archive/2004/06/24/164988.aspx; downloaded Dec. 15, 2008, Copyright 2008, Microsoft Corporation, 4 pages.

"Integrated Multi-Views," Journal of Visual Languages & Computing, Abstract, Jun. 1998, vol. 9, Issue 3, at URL: http://www.sciencedirect.com/science?_ob=ArticleURL&_udi=B6WMM-45J5BMS-P&_user=10&rdoc=1&_fmt=&orig=search&_sort=d&view=c&_acct=C000050221&_version=1&_urlVersion=0&_userid=10&md5=b16ea573128ea20191cc62fa49df0c46, Copyright 1998, Academic Press, 2 pages.

"JSF portlet with JWL Data Tree Component," at URL: http://www.ibm.com/developerworks/forums/thread.jspa?threadID=161906, downloaded Nov. 18, 2008, 4 pages.

"KNIME Quick Start Guide," at URL: http://www.knime.org/quickstartguide.html, downloaded Nov. 17, 2008; Copyright 2003-2008, University of Konstanz, Germany,10 pages.

"KWizCom Organization Chart web part Installation & User Guide" Copyright 2005, KWizCom Ltd, pp. 1-22.

"McGill Organizational Chart" McGill Organizational Chart Manual-Version Aug. 2, 2005; 11 pages.

Nation et al., "Browse Hierarchical Data with the Degree of Interest Tree," at URL: http://www2.parc.com/istl/groups/uir/publications/items/UIR-2002-12-Nation-CHI2002-DOIDemo.pdf, downloaded 2008, 2 pages.

"Organization Chart," at URL: http://www.aasoftech.com/Demo1/3LevelChart.htm, downloaded Feb. 2, 2011; 1 page.

"Organization charts from Office 2000 programs appear different in Office XP programs," at URL: http://support.microsoft.com/kb/293615, downloaded Nov. 20, 2008; Copyright 2008, Microsoft, 4 pages.

"Organization Chart" http://www.12manage.com/methods_organization_chart.html, downloaded Nov. 20, 2008, Copyright 2008 12manage, 3 pages.

"Organization Chart," at URL: http://www.longbowcg.com/home/services/downloads/coursewarevol2pdf.pdf, downloaded on or before Oct. 2010, 5 pages.

OrgPublisher http://www.orgpublisher.com/docs/pdf/v8/OP8_datasheet.pdf, downloaded on or before Oct. 2010.

"OrgPlus Professional Tour: 7. Automatically format charts based on the data they contain" at URL: http://www.orgplus.com/products/orgplus-professional/orgplus-professional-tour.htm#, downloaded Nov. 17, 2008, 2000-2008, Copyright HumanConcepts. 1 page.

"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, Human Concepts, 1 page.

OrgPlus Professional Tour 5. Create multiple customized chart views to present employee data differently, at URL:http://www.orgplus.com/products/orgplus-professional/orgplus-professional-tour.htm#, downloaded Nov. 20, 2008, 2000-2008, Copyright HumanConcepts, 2 pages.

"Org Chart Test" at URL: http://sandpit.reitsma.net.au/googleOrg/OrgChartTest.html; downloaded Dec. 15, 2008, 1 page.

Perkins, "Create an organizational chart with HTML, VML, and XML," downloaded Dec. 15, 2008, 3 pages.

"1. Portal Tour—Chapter 2. User Guide," at URL: http://www.polarion.com/products/alm/help/ug_quicktour.html, downloaded Nov. 20, 2008; 9 pages.

Plumlee et al.,"Zooming, Multiple Windows, and Visual Working Memory," at URL: http://ccom.unh.edu/vislab/PDFs/Zoom_Multi_VisualWM_final.pdf, 2008; 10 pages.

"Quixa Organisation Chart," at URL: http://www.quixa.com/bpmsuite/orgchart.asp, downloaded Nov. 20, 2008; Copyright 2008, Qiuxa Solutions, 1 page.

"QMF_V8-DB2 QMF Visionary Developer's Guide—Organization chart example," http://publib.boulder.ibm.com/infocenter/dzichelp/v2r2/index.jsp?topic=/com.ibm.qmf.doc.visd.dsqvdmst50.htm, downloaded Nov. 13, 2008, Copyright 1982, 2004, IBM Corporation 3 pages.

"Readerware views," at URL: http://www.readerware.com/help/rwViews.html, downloaded Nov. 20, 2008; Copyright 1999-2008, Readerware Corporation, 3 pages.

"Sage Abra OrgPlus Professional" Copyright 2007, Sage Software, 2 pages.

"Support Organization Chart" at URL: http://resources2.visual-paradigm.com/index.php/release-vp33/55-vp33/91-org-chart.pdf, Last updated Aug. 11, 2008, 5 pages.

Schaffer et al., at URL: "Navigating Hierarchically Clustered Networks Through Fisheye and Full-Zoom Methods," Fisheye versus Full Zoom Views, Mar. 24, 1998, pp. 1-20.

Stolte et al., "Multiscale Visualization Using Data Cubes," at URL: http://graphics.stanford.edu/papers/pan_zoom/paper.pdf, downloaded 2008, 8 pages.

TreeTable—Java applet combines grid and tree view, at URL: http://www.advancescripts.com/detailed/3201.html, downloaded Nov. 20, 2008; Copyright 2006, AdvanceScripts™, 2 pages.

"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.

"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.

"Understanding Data Graph Window Areas," at URL:http://docs.hp.com/en/B6454-97413/ch08s02.html, downloaded Nov. 18, 2008; Hewlett-Packard Development Company 2000, L.P, 3 pages.

"Welcome to Defura Infotech! Dynamic Org chart and Form Designer Tools," at URL: http://jayankv.com/OrgChartDetails.aspx, downloaded Nov. 13, 2008, Copyright 2007, Defure Infotech, 3 pages.

Zhao et al., "Elastic Hierarchies: Combining Treemaps and Node-Link Diagrams," at URL: http://www.dgp.toronto.edu/~sszhao/paperInforVis05_ElasticHierarchy.pdf, downloaded 2008, 8 pages.

U.S. Appl. No. 12/563,069, filed Sep. 18, 2009, Notice of Allowance mailed Dec. 15, 2011, 9 pages.

U.S. Appl. No. 12/563,071, filed Sep. 18, 2009, Notice of Allowance mailed Mar. 8, 2012, 8 pages.

U.S. Appl. No. 12/563,075, filed Sep. 18, 2009, Final Office Action mailed May 25, 2012, 15 pages.

U.S. Appl. No. 12/563,075, filed Sep. 18, 2009, Office Action mailed Jan. 24, 2012, 13 pages.

U.S. Appl. No. 12/563,082, filed Sep. 18, 2009, Final Office Action mailed May 29, 2012, 13 pages.

U.S. Appl. No. 12/563,082, filed Sep. 18, 2009, Office Action mailed Jan. 25, 2012, 12 pages.

U.S. Appl. No. 12/563,085, filed Sep. 18, 2009, Final Office Action mailed May 29, 2012, 13 pages.

U.S. Appl. No. 12/563,085, filed Sep. 18, 2009, Office Action mailed Jan. 26, 2012, 12 pages.

U.S. Appl. No. 12/490,250, filed Jun. 23, 2009, Notice of Allowance mailed Feb. 3, 2012, 8 pages.

U.S. Appl. No. 12/490,250, filed Jun. 23, 2009, Office Action mailed Sep. 28, 2011, 4 pages.

U.S. Appl. No. 12/490,250, filed Jun. 23, 2009, Office Action mailed Apr. 1, 2011, 8 pages.

U.S. Appl. No. 12/492,084, filed Jun. 25, 2009, Office Action mailed Feb. 13, 2012, 10 pages.

\* cited by examiner

SYSTEM AND METHOD FOR PROVIDING USER CONTEXT SUPPORT IN A NATIVE TRANSACTION PLATFORM

CROSS-REFERENCES TO RELATED APPLICATIONS

This application is a continuation of U.S. patent application Ser. No. 12/490,250, filed Jun. 23, 2009, entitled "SYSTEM AND METHOD FOR PROVIDING USER CONTEXT SUPPORT IN A NATIVE TRANSACTION PLATFORM," which is hereby incorporated by reference in its entirety for all purposes.

BACKGROUND OF THE INVENTION

Embodiments of the present invention are directed to techniques for providing user context for user threads in a service-oriented architecture.

In recent years, computer networks have become ubiquitous. In addition to providing data communication solutions, computer networks are also used to provide various services. For example, a server on a computer network will provide services to a client computer over the computer network. Typically, a service oriented architecture is used for providing services to client computers.

Typically, servers in service oriented architectures run process and/or threads for users. For example, a server in a network environment runs processes, which may have multiple threads, for a client computer. Those processes are typically server process. Users often have difficulties running user threads for various reasons.

Therefore, it is desirable to have techniques for facilitating the operation of users thread and providing context supports.

BRIEF SUMMARY OF THE INVENTION

Embodiments of the present invention are directed to techniques for providing user context for user threads in a service-oriented architecture. More specifically, in various embodiments, the present invention provides ways to create and terminating user threads and user contexts that are running at a server.

According to an embodiment, the present invention provides a computer-readable storage medium comprising processor executable codes. The computer-readable storage medium includes code for receiving information from a client entity at a server entity over a network. The computer-readable storage medium includes code for providing a server process at the service, the server process including one or more process threads. The computer-readable storage medium includes code for providing a first context associated the one or more process threads. The computer-readable storage medium includes code for receiving a user request from the client entity for a user thread, the user thread being associated with the service process. The computer-readable storage medium includes code for generating the user thread at the server entity. The computer-readable storage medium includes code for allocating memory for a user context at the server entity. The computer-readable storage medium includes code for associating the user thread to the user context. The computer-readable storage medium includes code for store information associated with the user thread in the user context.

According to another embodiment, the present invention provides a system for providing services. The system includes a communication network. The system includes a first client entity, the first client entity being communicative coupled to the communication network. The system includes a server entity, and the server entity includes a network interface being communicative coupled to the first entity through the communication network. The server entity also includes a processor for running at least a server process for the server entity, the server processing having one or more process threads. The server entity also includes a memory for storing thread contexts. The server entity is configured to receive a user request from the first client entity for a first user thread, the first user thread being associated with the server process. The server entity is configured to generate the first user thread. The server entity is configured to allocate memory for a first user context, the first user context being associated with the first user thread. The server entity is configured to associate the first user context to the first user context. The server entity is configured to store information associated with the first user thread at the first user context.

According to yet another embodiment, the present invention provides a method for providing services. The method includes receiving information from a client entity at a server entity over a network. The method includes providing a server process at the service, the server process including one or more process threads. The method includes providing a first context associated the one or more process threads. The method also includes receiving a first user request from the client entity for a user thread, the user thread being associated with the service process. The method includes processing the first user request. The method includes generating the user thread at the server entity. The method includes determining an availability of a memory. The method includes allocating an predetermined amount of memory for a user context at the server entity if the memory is available. The method includes associating the user thread to the user context. The method includes store information associated with the user thread in the user context.

The embodiments of the present invention are to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

DETAILED DESCRIPTION OF THE INVENTION

Figure 1:
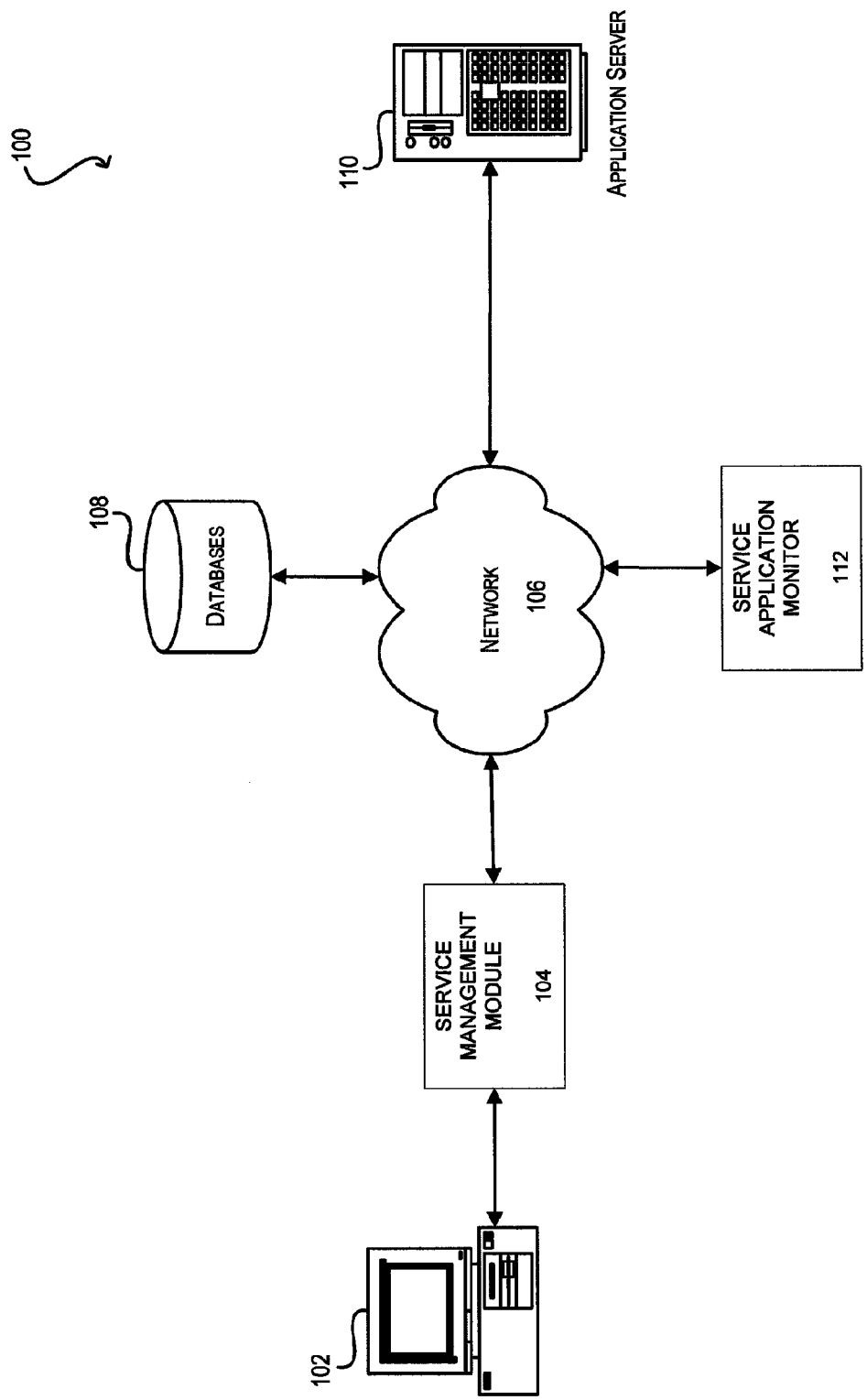
FIG. 1 is a simplified diagram illustrating a server system according to an embodiment of the present invention.

Embodiments of the present invention are directed to techniques for providing user context for user threads in a service-oriented architecture. More specifically, in various embodiments, the present invention provides ways to create and terminating user threads and user contexts that are running at a server.

As explained above, servers such as those used in Tuxedo™ system in service oriented architecture (SOA) environment often run one or more processes for user entities (e.g., client computers). At both server end and the user entities, one or more threads may be created for various purposes. For example, a user may create a thread for performing a transaction. As an example, the user created thread may be invoked in an API call.

There may be various types of threads in an SOA system. Typically, application thread refers to thread in a Tuxedo server that is created by a user for various purposes. As an example, the user is able to manage the lifecycle of those threads, for example, graceful terminate them when the server is shutdown by Tuxedo. Another type of thread is main thread, this is a thread for providing control (e.g., tpsvrinit( ), tpsvrdone( ), etc.). For example, the main thread calls service routine for single-threaded server. Another type of thread is a server-dispatched thread, which is used to process service requests in a multi-threaded server. As an example, the number of server-dispatched threads can be configured user specific types of command and/or tools: MINDISPATCHTHREADS and MAXDISPATCHTHREADS in UBBCONFIG.

To facilitate the use of threads, various procedures may need to be observed. For example, a Tuxedo™ system requires context to be used in conjunction with various types of threads to make sure that Tuxedo application can operate correctly. Generally, a context is a place to store internal information required by Tuxedo. In certain cases, some Application-to-Transaction Manager Interface (ATMI) APIs (e.g., tpacall( ), tpgetrply( ), etc.) need to be invoked with a valid context. In some other cases, APIs (e.g., tpalloc( ), tpfree( ), etc.) can work with or without an valid context.

The existing system provides system context, which generally refers to those context that re created and maintained by a Tuxedo™ infrastructure. For example, for a multi-threaded server Tuxedo™ creates one system context for every working thread. Similarly, for multi-context client Tuxedo creates one system context for every thread (e.g., a successfully thread creation, tpinit( )). However, systems currently do not provide user context.

Typically, threads created by user in Tuxedo application server cannot safely for transactions, as the user created thread do not have valid or proper context. In the past, users try to make a workaround by sharing context with Tuxedo managed threads. However, this type of workaround is tricky and thereby often error prone.

Thus, it is to be appreciated embodiments of the present invention provide technique for user context. User context generally refers to context created by new API introduced by the user. Typically, a user context is created at the server. It is typically a user's responsibility to the user context up server termination.

As shown in FIG. 1, a networked computing environment 100 includes the following:

1. a client computer 102;
2. a service management module 104;
3. a network 106;
4. a database 108;
5. a service application monitor 112; and
6. an application server 110.

According to various embodiments, the network computing environment 100 is in a service-oriented architecture (SOA). In this architecture, the service management module facilitates application servers (e.g., application server 110) to provide services to the client computer 102. Using the SOA, the networking computing environment 100 allows different applications to exchange data with one another. In various embodiments, the networking computing environment 100 is implemented using Tuxedo™ systems.

The application server 110 provides services to the client computer 102 by passing data through the network 106, and this process is coordinated by the service management module 104. For example, the service management module 104 comprises a Tuxedo™ server. When the application server 110 provides services to the client computer 102, the services are provided as service contracts. As an example, a service contract contains services that are compliant with a communication agreement (e.g., defined by Tuxedo™ system), which may include information such as name, information of request buffer, reply buffer and error buffer if present, for a service.

Among other services, the application server 110 is configured to run various applications and/or processes. For example, the client computer 102 request processes to be performed by the application server 110 by invoking calls such as ATMI and/or API calls. The application server is configured to run server applications and/or processes for the client computer 102. Each of the application and/or processes may have one or more threads. According to various embodiments, the application server 110 is able to run both user threads and server threads. The application server 110, among other features, is configured to provide contexts for both application threads at the server and user threads requested by users. For example, upon receiving user request from the client computer 102 to create a user thread, the application server 110 allocates memory and creates a user context (and multiple contexts if needed) for the user thread. Upon termination of the user thread, the application server 110 clears the user context. The detailed description of the user context is described below.

Depending on the application, the service management module 104 may be used to facilitate application server 110 to provide services (e.g., running applications and/or threads for users). In certain embodiment, service management module 104 is a part of application server 110.

Figure 2:
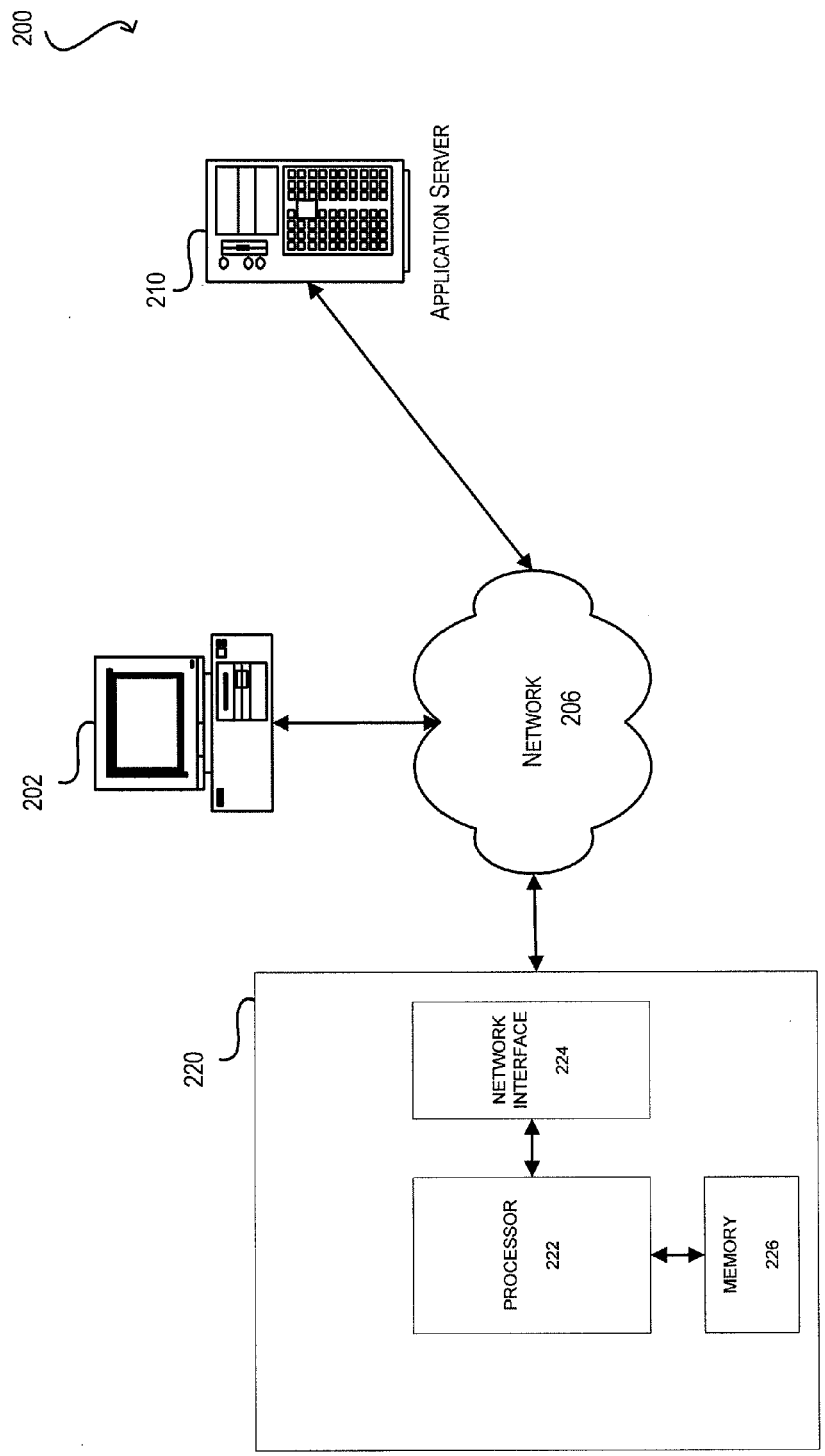
FIG. 2 is a simplified diagram illustrating a server that is configured create user context according to an embodiment of the present invention.

FIG. 2 is a simplified diagram illustrating a server that is configured create user context according to an embodiment of the present invention. This diagram is merely an example, which should not unduly limit the scope of the claims. One of ordinary skill in the art would recognize many variations, alternatives, and modifications.

As shown in FIG. 2, a server 220 is connected to the client computer 202 via the network 206. As an example, the server 220 comprises a Tuxedo™ server, which comprises services that can be used by client computers. Depending on the application, other servers (e.g., server 210) may be connected to the client computer 202, as a part of the network environment 200. For example, the servers 220 provides service directly to client computer 220 or through other entities (e.g., administrative entities).

Among other things, the server 220 is configured to run various server applications and/or processes on behalf of the client computer 202. As explained above, the server 220 is may run both server threads and user threads. When running user threads, the server 220 allocates memory and generates user contexts to support the user threads.

As shown in FIG. 2, the server 220 comprises, among other components, a processor 222, a network interface 224, and a memory 226. The server 220 communicates with the various entities using its network interface 224. For example, the network interface 224 is compatible with various types of communication protocols. The server 220 also includes processor 222 that is configured to perform a variety of tasks. Among other tasks, the processor 222 is able to run both server threads and user threads. For example, the processor 222 handles and/or fulfills API calls (e.g., requested from entities such as the client computer 202).

For example, the processor 222 processes requests from the client computer 202 to create one or more threads. The processor 222 creates user threads and user context thereof. For example, the user context may be stored at the memory 226. For example, the memory 226 is used ask buffer memory for both server contexts and user contexts. The detailed operation of the server 220 is described below.

According to various embodiments, specific APIs are provided for user threads. For example, Tuxedo™ system introduces two new APIs, tpappthrinit( ) and tpappthrterm( ). Theses two APIs are intended for managing Tuxedo™ user context. As a result, user-created threads have their own contexts and do not need share context with server-managed threads. It is to be appreciated that embodiments of the present invention make it easy for programming and management. In a specific embodiment, user context can be shared between user that created the threads. Server APIs can be safely made under the new context.

It is further to be appreciated that embodiments of the present invention provides various advantages over existing techniques. Sometimes a user wants to create gateway process between Tuxedo and/or other business layer. For various reasons, the user wants the gateway to be managed by the Tuxedo system for processes such as auto-restart, boot, shutdown status check, etc. In conventional systems, creating gateway process with Tuxedo server is often difficult, as no Tuxedo context available. In contrast, the techniques according to embodiments of the present invention allow user to use specific types of APIs (e.g., tpappthrinit( ) and tpappthrterm( ), etc.) to acquire users context for user threads, thereby allowing the Tuxedo calls to be made safely. At the same time, the Tuxedo managed service threads can still serve client's request normally.

Typically, Tuxedo™ system only supports multiple contexts explicitly in client side. For the application server programming, Tuxedo uses a managed thread pool model and each thread is associated with its own context. The start/stop of the service thread is managed by Tuxedo framework and user's service routine is called during the unique context environment. As a result, most of ATMI calls can be made in the service routine. For certain type of application thread created by user, Tuxedo ATMI calls cannot be called straightforward since the application thread will access the context owned by the service thread. To overcome this problem, some users developed workaround in which the service routine never return except ATMI activities so that application thread can use the context safely.

In various embodiments of the present invention, a new approach for the server programmers is provided. Among other features, new APIs are introduced to provide new functionalities. In user created thread, a user can create new Tuxedo context so that the following ATMI calls can operate under this user context. As a result, the user thread can work concurrently with the service thread and no need to pay attention about context sharing. Additionally, in the application thread, user can terminate current application association so that the registry slot can be reclaimed and the user context is removed.

Now referring back to FIG. 2, newly introduced APIs provided by embodiments of the present invention enable the server 220 to perform any allowed Tuxedo calls in the application thread without the nee for context sharing with service thread. This feature expands, in comparison to existing server, the capability of the server 220 in playing an important role under a heterogeneous enterprise computing environment. For example, the server 220 is specifically configured to be compatible in Tuxedo™ environment.

In various embodiments, two new APIs are introduced to allow users create and terminate user context in Tuxedo server. For example, user contexts are not treated differently compared to system contexts.

For conflict scenario, for example, if one thread calls tpappthrterm( ), then another thread under this context makes tpcall, the error code must be returned complying with client multi-context behavior.

According to embodiments, Tuxedo ATMI APIs that are allowed in a server are also allowed in an application thread with the new context. The exceptions are for APIs that involves forwarding API calls from one server to another (e.g., tpreturn/tpforward). Depending on the application, other types of APIs are supported, such as those listed below:

APIs not Related with Context
tpalloc/tpfree/FML/MBSTTRING/tperypt_xxx/tpblktime/tpsprio/userlog
RPC APIs
tpcall/tpacall/tpgetreply/tpcancel
Transaction APIs
tpbegin/tpcommit/tpabort/tpopen/tpclose
Conversation APIs
tpconnect/tpsend/tprecv/tpdisconnect
Unsolicited Notification APIs
tpsubscribe/tppost (tpsetunsol is not supported since it is only allowed in client process)
Q Operation
tpenqueue/tpdequeue The API mentioned above supported. For transaction types of API, APIs such as tpopen/tpclose cannot be made in the application thread since they are used for server managed thread.

In various embodiments, user contexts creation are only available if the server is enabled for this features. For example, using the "-t" option of buildserver, the server is able to generate the multi-threaded server with multi-context. For example, a server that is enabled with the ability to create user context makes it possible to make Tuxedo ATMI calls freely in an application thread. For example, for application thread, the server uses a user context if it calls one or more ATMI APIs that need to run with a valid context.

In an exemplary embodiment, an user context is enabled in a Tuxedo™ server, which meets the following functions requirements:

The process needs to be running a Tuxedo server that is configured in UBBCONFIG and managed by Tuxedo.
Most Tuxedo clients functionality should be available in the server process (see below for the list).

The user context feature does not prevent users from constructing their specific gateway process. For example, socket operation must be controlled by user completely.

Existing application server related characteristics are maintained.

The interface is properly documented.

The list of ATMI APIs can be run safely in User Context is as following:

tpalloc( ), tprealloc( ), tptypes( ), tpfree( )

tpgetctxt( ), tpsetctxt( ), tpcall( ), tpacall( ), tpgetrply( ), tpcancel( ), tpconnect( ), tpdiscon( ), tpsend( ), tprecv( ), tpenqueue( ), tpdequeue( ), tpbegin( ), tpcommit( ), tpabort( ), tpgetlev( ), tpsuspend( ), tpresume( ), tpopen, tpclose.

tpgblktime( ), tpsblktime( ).

The Tuxedo servers need be built with "-t" option enabled with multithreaded and multicontexted support; otherwise APIs such as tpappthrinit and tpappthrterm will fail and set tperrno to TPEPROTO.

In addition to the functional requirements listed above, various interface requirements are provided as well:

User Context in Serve Process

In an exemplary embodiment, a Tuxedo server provides multi-context and multi-thread programming support in a client process. For example, the application server supports the multi-context and multi-thread features, and the threads and context are managed by a Tuxedo infrastructure (or, System Context). In one embodiment, the system contexts are not shared safely between application thread and service dispatching thread. In an alternative embodiment, in a release of Tuxedo, for example version 10.1, the system provides context management routines to let user use multi-thread and multi-context just as what can be done in a client process.

Context Management API

To provide good interface, new APIs, such as tpappthrinit( ) and tpappthrterm( ), are introduced for the server process. They are used to create and terminate user context. For example, the APIs tpappthrinit( ) and tpappthrterm( ) have similar functionalities with tpinit( ) and tpterm( ), but they have slightly difference in semantics regarding security, unsolicited message etc.

To further illustrate, an exemplary use of the API for initiating a user thread is explained below:

API tpappthrinit(3c)

Name tpappthrinit( )—Routine for creating and initialize a new Tuxedo context in an application thread.

Synopsis include <atmi.h> int tpappthrinit(TPINIT *tpthrinfo);

Description of tpappthrinit( ): this API creates a new Tuxedo context in an application thread of a server process. It also sets the context with current thread. After it successfully returns, the allowed APIs can be used freely.

In an application thread in a server process, any ATMI API calling should be invoked with a new context with a successful invocation of tpappthrinit( ), otherwise the result is unpredicted. The context created in current thread can be shared by other application thread with tpgetctxt( )/tpsetctxt( ). It is important to remember that the context created by tpappthrinit( ) can not be mixed with the service dispatching thread which managed by Tuxedo infrastructure.

For example, as a part of the tpappthrinit's argument, the argument "tpthrinfo" is a pointer to a typed buffer type TPINIT and a NULL type. The argument "TPINIT" is a buffer type that is typedefed in the atmi.h header file. The buffer must be allocated via tpalloc prior to calling tpappthrinit( ). The buffer is freed using tpfree( ) after calling tpappthrinit, which can be invoked by user and/or system.

For the tpappthrinit routine, the values of username, cltname, grpname, and passwd are defined as NULL-terminated strings. The value "username" is a name representing the caller and its value should not have more characters than MAXTIDENT, which is defined as 30. The terms "cltname," "grpname" and "passwd" are set to a O-length string. The value "flag" is also not currently used. The value "datalen" is the length of the application-specified data that follows. It should be set based on the total size passed in for the buffer (the application data size is the total size less the size of TPTHRINIT structure itself plus the size of data placeholder as defined in the structure). The value "data" is a placeholder for variable length data that is forward to an application-defined authentication service. It is always the last element of this structure.

As explained above, the API tpappthrinit( ) can only be invoked in a server process and the server must be built with -t option.

For example, most of the ATMI APIs are permitted in server process except tpreturn and tpforward are allowed in the application thread which associated with a Tuxedo context by tpappthrinit( ).

Return values are provided when the API tpappthrinit( ): upon successfully creating a Tuxedo context, returns 0; upon failure, tpappthrinit( ) returns −1 and sets tperrno to indicate the error condition. The caller will leave in TPNULLCONTEXT.

For example, the server are configured to determine and/or report errors, for various situations. Upon failure, tpappthrinit( ) sets tperrno to one of the following values.

[TPEINVAL]

Invalid arguments were specified. tpthrinfo is non-NULL and does not point to a typed buffer of TPINIT.

[TPEPROTO]

tpappthrinit( ) is called in a wrong process context. The most possible reason is tpappthrinit is invoked in a client program or service routine. tpappthrinit( ) only can be called in application thread in a server process. And the servers must be built with "-t" option in executing buildserver command.

[TPENOENT]

The context could not be created due to space limitations. For example: (a) There is no free BB slots.

[TPEPERM]

Failure to pass application-specific authentication, or use of restricted names.

[TPESYSTEM]

A Tuxedo system error has occurred. The exact nature of the error is written to a log file.

[TPEOS]

An operating system error has occurred.

API tpappthrterm(3c)

The API tpappthrterm ( ) is a routine for free Tuxedo User context in a server process. For the example, the syntax below is used:

Synopsis include<atmi.h> int tpappthrterm(void);

Similar to the operation of API tpterm( ), the API tpappthrterm( ) disassociate current thread with Tuxedo application. After this call, following ATMI calls in an application thread are not safe.

If the application thread is in transaction mode, then the transaction is rolled back. When tpappthrterm( ) returns successfully, the caller can no longer perform Tuxedo ATMI operations. Any outstanding conversations are immediately disconnected. Depending on the application, the API tpappthrterm( ) is invoked (1) in a server process; and (1) when the server needs to be built with -t option in executing buildsever program. In an embodiment, the API cannot be invoked in service routines and system context, as it only works in context that is created by tpappthrinit routine.

Return Values are provided based on the operation of the API tpappthrterm( ). Upon successfully freeing a Tuxedo context, returns 0 and set current context to TPNULLCONTEXT.

Upon failure, tpappthrterm( ) returns −1 and sets tperrno to indicate the error condition. Depending on the situation, there may be various types of errors. For example, upon failure, the API tpappthrterm( ) sets tperrno to one of the following values:

[TPEPROTO]
tpappthrterm( ) is called in a wrong process context. The most possible reason is tpappthrterm is invoked in a client program or service routine or in system context.
tpappthrterm( ) only can be called in application thread in a server process.
[TPESYSTEM]
A Tuxedo system error has occurred. The exact nature of the error is written to a log file.
[TPEOS]
An operating system error has occurred.

The support for programming a user server context is provided based on whether the server is enabled with such service. User server context only can be created in tuxedo server, so platform support consideration should be followed too.

As an example, an Oracle Tuxedo system allows the user to create one or multiple separate context associated to a domain in user application threads which are created in a server of same domain by invoking the API tpappthrinit.

Figure 3:
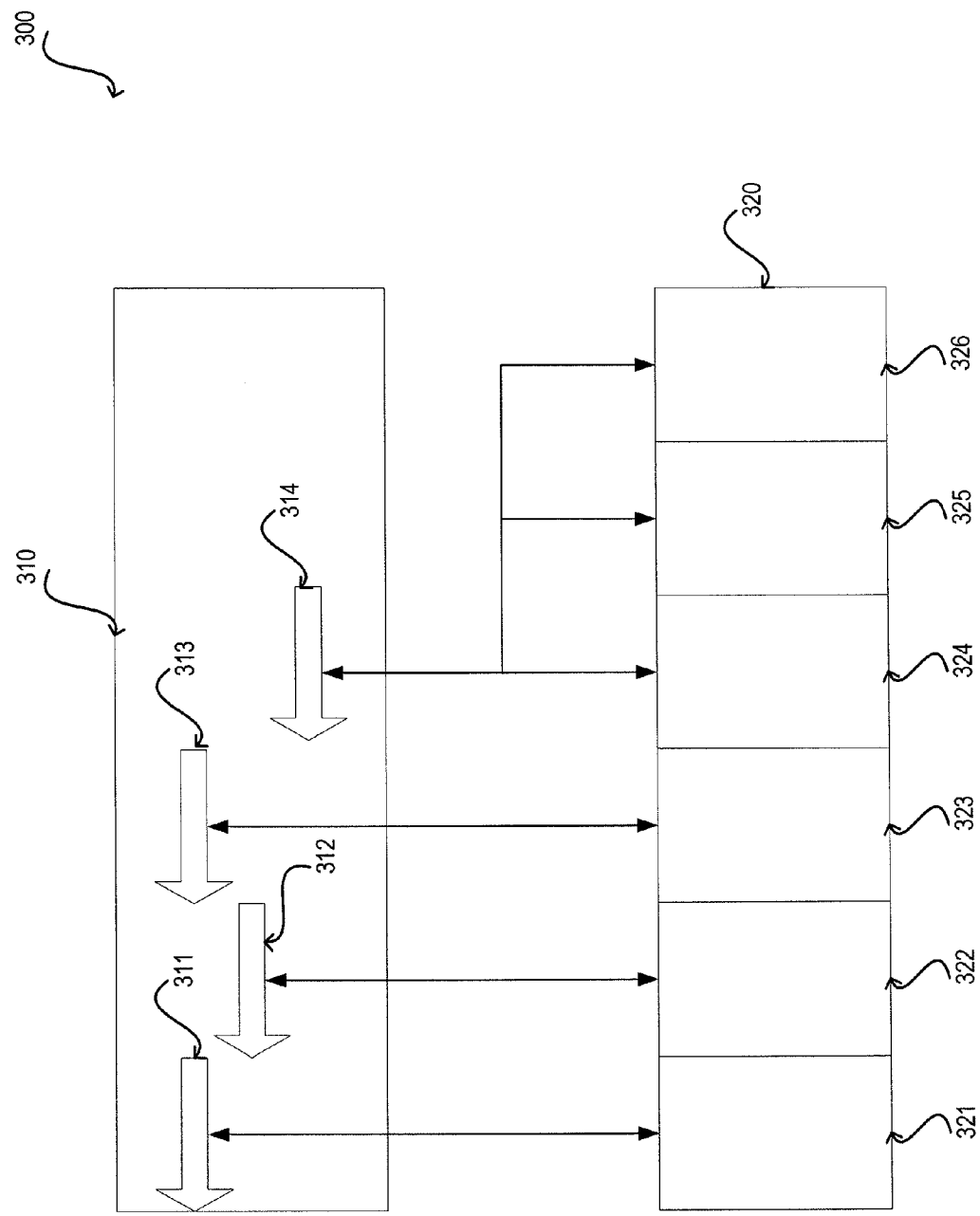
FIG. 3 is a simplified diagram illustrating a process of associating user contexts to user thread(s).

FIG. 3 is a simplified diagram illustrating a process of associating user contexts to user thread(s). This diagram is merely an example, which should not unduly limit the scope of the claims. One of ordinary skill in the art would recognize many variations, alternatives, and modifications. As shown, a process 310 has multiple threads: threads 311-314. A memory 320 is used to provide space for user contexts. For example, the threads share system resources through multiplexing. Threads 311-313 are server threads and are respectively associated with contexts 321-322. Thread 314 is a user thread. For example, the user thread is created using the API "tpappthrinit." The user thread 314 as shown is associated with user contexts 324-326. It is to be appreciated that depending on the specific application, one or more user contexts may be used for a single user thread.

Each user server context is counted as one user. For example:

If a server process has two user application threads and each of it calls tpappthrinit to create separated context, the Tuxedo system counts a total of two users.
If a server process has multiple user application threads and all of them share same user server context which is created by one of or other user application thread after successfully invoked tpappthrinit routine, the Tuxedo system counts only one user.

Figure 4:
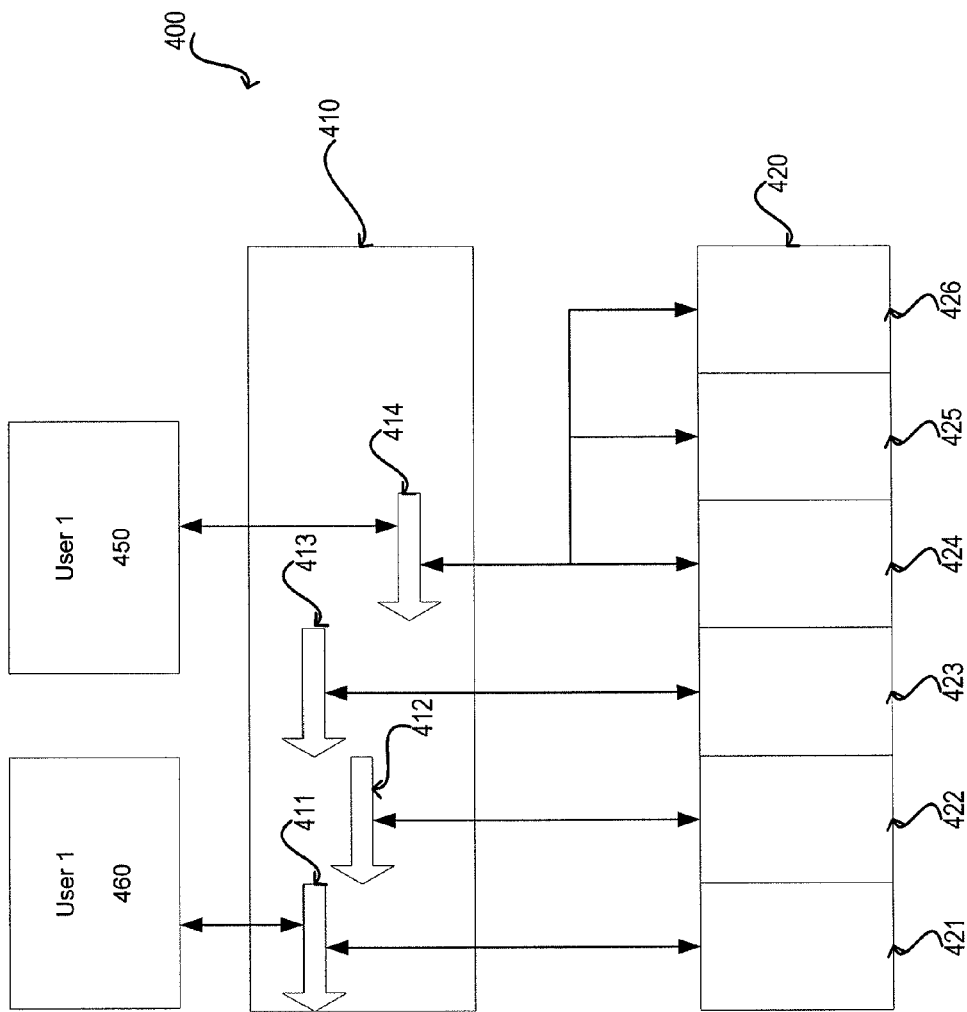
FIG. 4 is a simplified of a process for assigning user contexts to user threads.

FIG. 4 is a simplified of a process for assigning user contexts to user threads. This diagram is merely an example, which should not unduly limit the scope of the claims. One of ordinary skill in the art would recognize many variations, alternatives, and modifications. As shown in FIG. 4, a process 410 has multiple threads: threads 411-414. Threads 412 and 413 are server threads, and they are associated with the server contexts 422 and 423 respectively. The threads 411 and 412 are user threads that are created using the API tpappthrinit, and each of these two threads is treated as a thread from a different user. As shown in FIG. 4, the user 460 is responsible for thread 411, and the user 450 is responsible for thread 414. It is to be understood that the user 450 and user 460 may be the same user.

As an example, events that occur in an ATMI server when application thread is created and active can be described in three phrase: (1) start-up phrase; (2) work phrase; and (3) completion phrase.

Start-Up Phrase

At the start-up phrase, Application thread creates separate context associated to existing domain which server in by calling tpappthrinit(3c). Other application threads share the contexts created by the first set of threads by calling tpsetctxt (3c). Some application threads switch to an existing context. In such situations, one application thread calls tpgetctxt(3c) and passes the handle that is returned (the value of which is the current context) to a second application thread. The second application thread then associates itself with the current context by calling tpsetctxt(3c) and specifying the handle received from tpgetctxt(3c) via the first application thread. Once the second thread is associated with the desired context, it is available to perform tasks executed by ATMI functions that operate on a per-thread basis.

Work Phrase

In this phrase each application thread performs a task as listed in below:

An application thread issues a request for a service.
An application thread gets the reply to service request.
An application thread initiates and/or participates in a conversation.
An application thread begins, commits, or rolls back a transaction.

When an application thread issues a request for a service, the application thread sends a request to a server(which may be same server which belong to) by calling either tpcall( ) for a synchronous request or tpacall for an asynchrous request. If the request is sent with tpcall( ), the reply is received without further action by any thread.

If an asynchrous request for a service has been sent with tpacall( ), a application thread in the same context(which may or may not be the same application thread that sent the request) gets the reply by calling tpgetrply( ).

If one application thread starts a transaction, then all application threads that share the context of that application thread also share the transaction.

Many application threads in a context may work on a transaction, but only one application thread may commit or abort it. The application thread that commits or aborts the transaction can be any application thread working on the transaction; it is not necessarily the same application thread that started the transaction. Threaded applications are responsible for providing appropriate synchronization so that the normal rules of transactions are followed. (For example, there can be no outstanding RPC calls or conversations when a transaction is committed, and no stray calls are allowed after a transaction has been committed or aborted.) A process may be part of at most one transaction for each of its application associations.

If one application thread of an application calls tpcommit( ) concurrently with an RPC or conversational call in another thread of the application, the system acts as if the calls were issued in some serial order.

A log "Userlog" maintains thread-specific information. For each thread in each application, the userlog(3c) records the following identifying information:
process_ID.thread_ID.context_ID.
Completion Phrase In this phase, when the server process is about to exit, on behalf of the current user server context and all associated application threads, a application thread ends its application association by calling tpappthrterm( ). It affects all threads for which the context is set to the terminated context, and terminates any commonality of context among these application threads.

A well-designed application normally waits for all work in a particular user context to complete before it calls tpappthrterm( ). Be sure that all application threads are synchronized before your application calls tpappthrterm( ).

In various embodiments, coding rules are following for users contexts. As an example, these rules are listed below:

- Only server process can invoke tpappthrinit( )/tpappthrterm( ).
- The server must be built with "-t" option to enable multi-threaded in executing buildserver program.
- It is prohibited to call tpappthrinit( )/tpappthrterm( ) in service routine and system context(tpsvrinit, tpsvdone, tpsvrthrinit, and tpsvrthrdone). Or it will return −1 and sets tperrno(5) to TPEPROTO.
- It should be avoided calling tpappthrterm( ) on a user context while other application threads are still working on that context. Or the result is unpredictable.
- The synchronization between multiple application threads which share same user context must be carefully designed.
- If current server is in a transaction group with configured user RM, the resource managers should support multi-threading.
- Any application thread operating in the same context within the same server process can invoke tpgetrply( ) to receive a response to an earlier call to tpacall( ), regardless of whether or not that application thread originally called tpacall( ).
- A transaction can be committed or aborted by only one application thread, which may or may not be the same application thread that started it.
- If application thread want start a transaction related to current RMS configured in server GROUP, it must explicitly call tpopen before starting this transaction.

Context state changes for application threads using user context. For example, after successfully calling tpappthrinit( ), the current application thread is set to new context, and this context can be obtained by calling tpgetctxt( ) and passed to other application threads to share same context. If there is a failure, then current context will be set to TPNULLCONTEXT.

After successfully calling tpappthrterm( ), current application thread will be set to TPNULLCONTEXT. If invoked tpappthrterm( ) in NULL context, tpappthrterm will do nothing and return 0.

User context support is authorized by way of ACL. When current TUXCONFIG security type is configured to MANDATORY_ACL, the argument tpthrinfo must not be NULL, or tpappthrinit return −1 and set tperrno(5) to TPINVAL. If there is an authorization failure, tpappthrinit( ) will return −1 and set tperrno(5) to TPEPERM. The tpthrinfo argument is a pointer which point a TPINIT type buffer with NULL sub-type, it should be allocated by calling tpalloc and freed by calling tpfree. See tpappthrinit(3c) for more description.

As an example, using per-context functions and data structures in a user context are provided for the following APIs:
tpcall( ),
tpacall( ),
tpgetrply( ),
tpcancel( ),
tpconnect( ),
tpdiscon( ),
tpsend( ),
tprecv( ),
tpenqueue( ),
tpdequeue( ),
tpbegin( ),
tpcommit( ),
tpabort( ),
tpgetlev( ),
tpsuspend( ),
tpresume( ),
tpopen,
tpclose.
tpgblktime( ),
tpsblktime( ).

Using per-process functions and data structures in user context is support as the following APIs:
tpalloc( ),
tprealloc( ),
tptypes( ),
tpfree( )

Using per-thread functions and data structures in user context are supported as the following APIs:
tpgetctxt( ),
tpsetctxt( ),
tpstrerror( ).

To further illustrate, a programming is provided below:

| Programming Example(pthread) |
|---|

```
#include <stdio.h>
#include <pthread.h>
#include <atmi.h>
#include <userlog.h>
void *thread_func(void *threadid);
void do_call( );
static tuxdone = 0;      /* synchronize token for shutdown */
static appthrdone = 0;   /* Synchronize token for shutdown */
void tpsvrdone(void)
{
    tuxdone = 1;
    while ( !appthrdone)
    {
        sleep(1);
    }
}
tpsvrinit(int argc, char *argv[ ])
{
    int rval;
    int tid;
    rval = pthread_create(& tid,NULL,thread_func,NULL);
    if (rval) {
        userlog("Application thread create failed");
        return(−1);
    }
    return(0);
}
TOUPPER(TPSVCINFO *rqst)
{
    int i;
    for(i = 0; i < rqst->len−1; i++)
        rqst->data[i] = toupper(rqst->data[i]);
```

```
Programming Example(pthread)

/* Return the transformed buffer to the requestor. */
    tpreturn(TPSUCCESS, 0, rqst->data, 0L, 0);
}
Void * thread_func(void *p)
{
    tnt ret;
    sleep(2);
    ret = tpappthrinit( );
    if (ret < 0 ) {
        userlog("tpappthrinit failed");
        return NULL;
    }
    while (1) {
        if (tuxdone) {
            break;
        }
        do_call( );
    }
    tpappthrterm( );
    appthrdone = 1;
    return NULL;
}
void do_call( )
{
    char *sendbuf, *rcvbuf;
    long sendlen, rcvlen;
    int ret;
    if((sendbuf = (char *) tpalloc("STRING", NULL, 10)) == NULL) {
        (void) fprintf(stderr,"Error allocating send buffer\n");
        tpterm( );
        exit(1);
    }
    strcpy(sendbuf,"hello");
    if((rcvbuf = (char *) tpalloc("STRING", NULL, 10)) == NULL) {
        (void) fprintf(stderr,"Error allocating receive buffer\n");
        tpfree(sendbuf);
        tpterm( );
        exit(1);
    }
    ret = tpcall("TOUPPER", (char *)sendbuf, 0,(char **)&rcvbuf,
        &rcvlen, (long)0);
    if (ret < 0 ) {
        userlog("tpcall failed %s", tpstrerror(tperrno));
    }
    tpfree(rcvbuf);
    tpfree(sendbuf);
}
```

Figure 5:
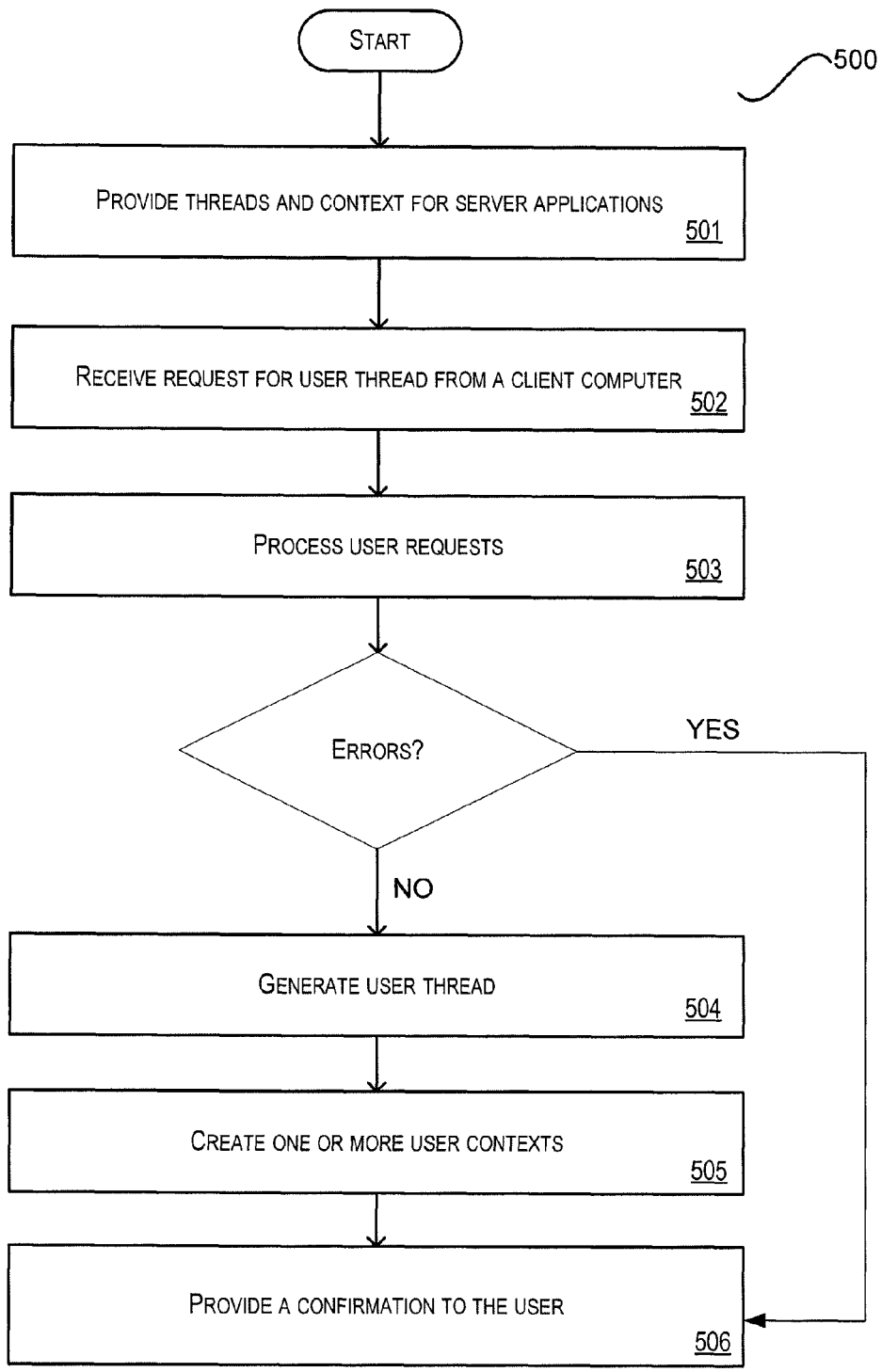
FIG. 5 is simplified flow diagram illustrating the process for initiating user thread and user context according to an embodiment of the present invention.

An example, the process of initiating user thread and its user context is illustrated in FIG. 5. FIG. 5 is simplified flow diagram illustrating the process for initiating user thread and user context according to an embodiment of the present invention. This diagram is merely an example, which should not unduly limit the scope of the claims. One of ordinary skill in the art would recognize many variations, alternatives, and modifications. As an example, various steps as shown may be added, removed, repeated, modified, replaced, rearranged, and/or overlapped. For example, the process 500 shown in FIG. 5 is implemented for the systems illustrated in FIGS. 1 and 2.

As shown, the process 500 initiated at step 501. At step 501, a server provides and runs one or more server threads that are associated with one more applications.

At step 502, a request is received from user to create a user thread and one or more user context for the user thread. For example, the user thread is sent from the client computer to the server via a communication network. The request, according to one embodiment, comprises an API call.

At step 503, the user request is processed. Among other things, the user request may includes various specification, such as the size and location (e.g., specified by a pointer) for the user context that are to be created. A processor at the server processes the user requests and determined what to be done. For example, if the processor determines that there are one or more errors with the user request (e.g., there is no memory for the requested user context), the process jumps to step 506 to return user an error message. Exemplary causes for errors are described above.

On the other hand, if it is determined that there is no error with the user request, the process proceeds by generating a user thread at step 504. For example, the user thread is associated with a server application and/or process as described above.

At step 505, one or more user contexts are created for the user thread. For example, the user contexts are created to support various functions for the user thread. Once the user thread is created, a confirmation provided to the user to indicate the success with creating the thread.

Figure 6:
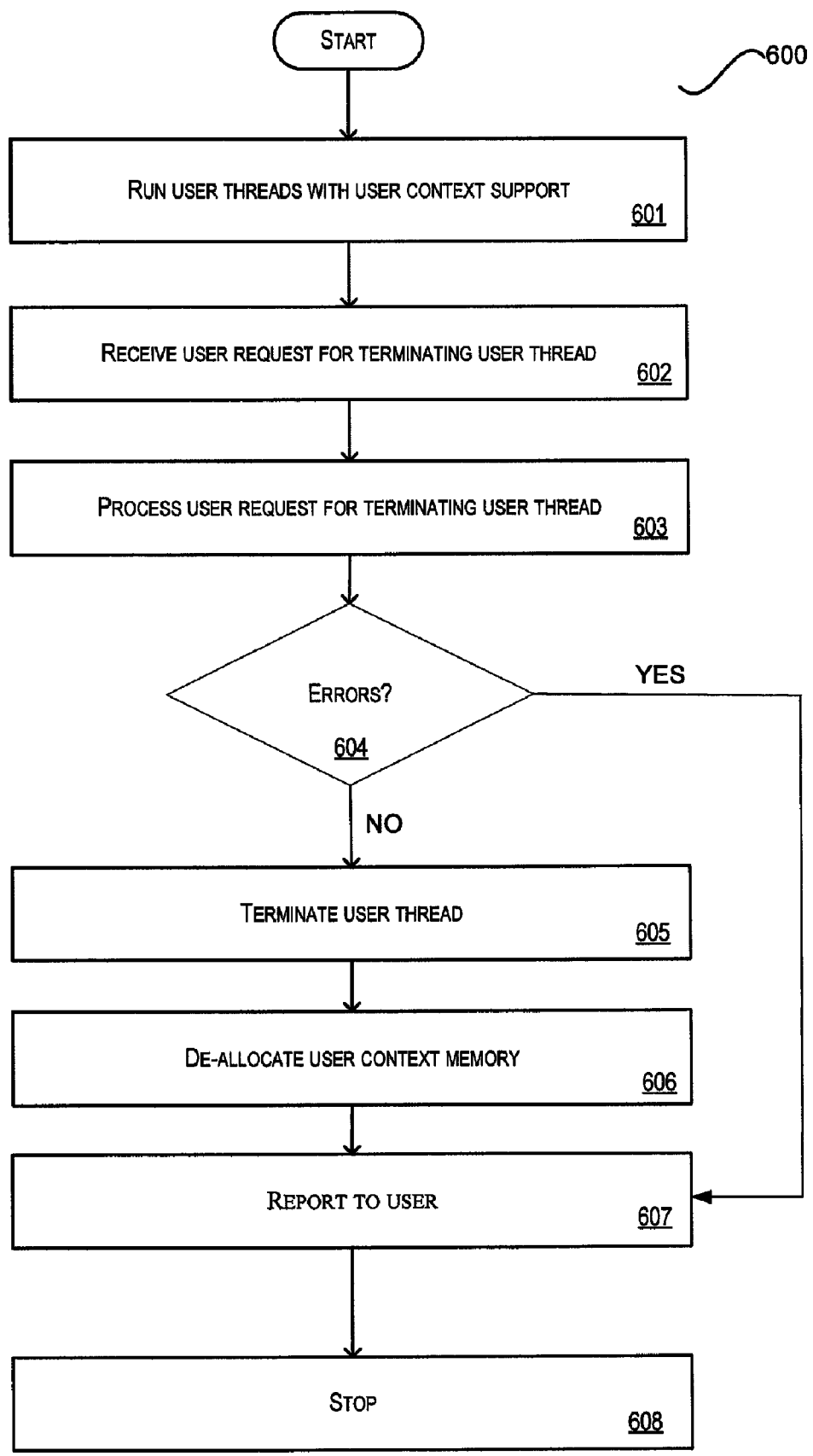
FIG. 6 is simplified flow diagram illustrating the process for terminating user thread and user context according to an embodiment of the present invention.

An example, the process of terminating user thread and its user context is illustrated in FIG. 6. FIG. 6 is simplified flow diagram illustrating the process for terminating user thread and user context according to an embodiment of the present invention. This diagram is merely an example, which should not unduly limit the scope of the claims. One of ordinary skill in the art would recognize many variations, alternatives, and modifications. As an example, various steps as shown may be added, removed, repeated, modified, replaced, rearranged, and/or overlapped. For example, the process 600 shown in FIG. 6 is implemented for the systems illustrated in FIGS. 1 and 2.

As shown in FIG. 6, a user thread is already running with the support of its user context, at step 601. At step 601, a user request is received for terminating the user thread. For example, the user request comprises an API call that identify the user thread for termination.

At step 603, the user request for thread termination is processed. Among other things, the system determines whether there are errors associated with the user request, such as the user thread for terminating being non-existent, etc. Exemplary reasons for errors are described above. If there is any error with the user request, an error message is sent to user at step 607. On the other hand, if there is no error with the user request, the user thread is terminated at step 605. Memory associated with the user context for the terminated user thread is terminated at step. A report is send to user at step 607 to indicate whether the user thread is successfully terminated. The process ends at step 608.

Figure 7:
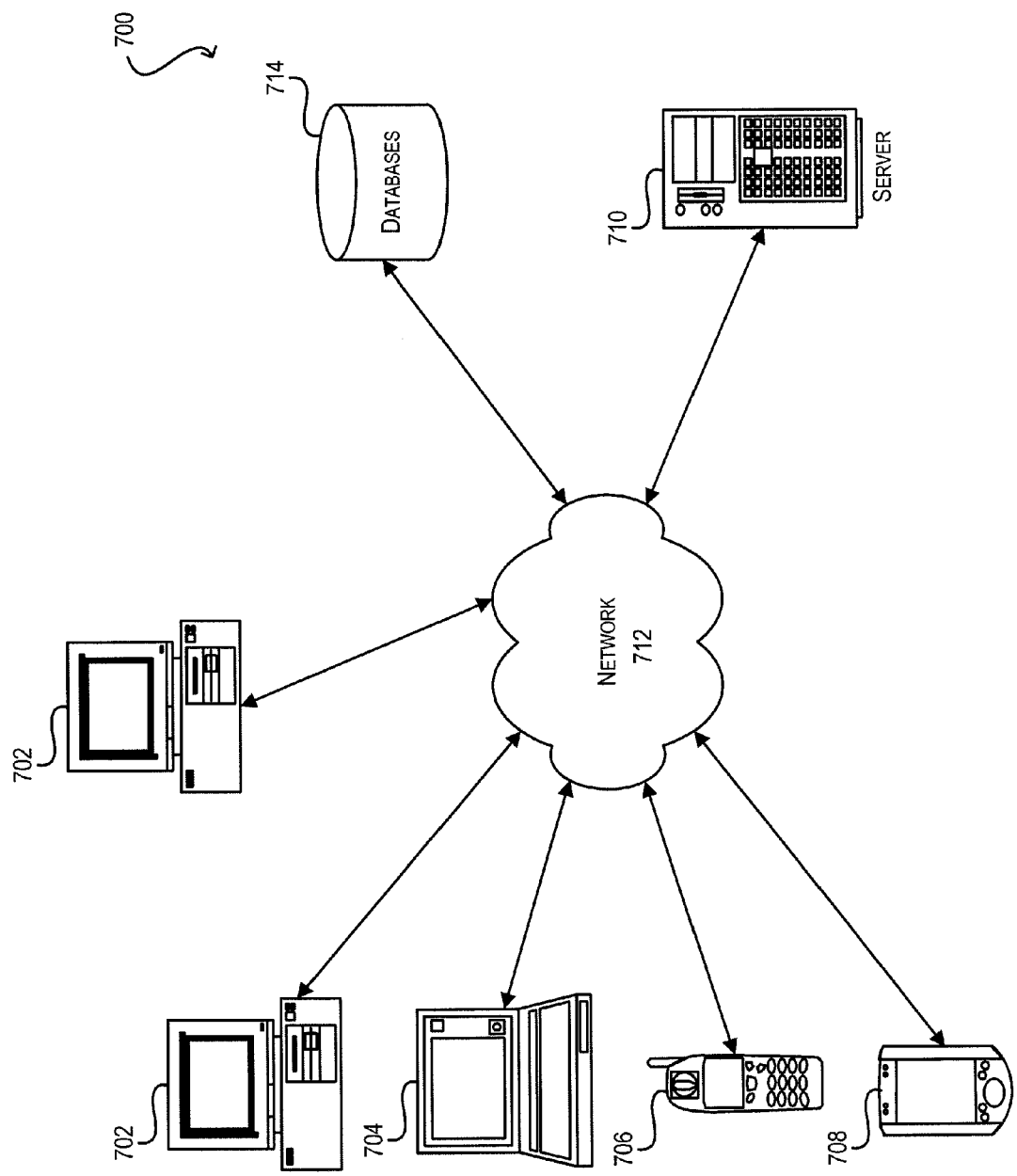
FIG. 7 is a simplified block diagram illustrating physical components of a system environment 700 that may be used in accordance with an embodiment of the present invention.

It is to be appreciated that the system for providing user thread and/or user context can be implemented with various types of hardware systems. FIG. 7 is a simplified block diagram illustrating physical components of a system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may request service from the server computer 710. For example, each of the client computing devices may be compatible with the message format of Tuxedo™ system.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic devices capable of communicating over a network (e.g., network 712 described below) with server computer 710. Although system environment 700 is shown with four client computing devices and one server computer, any number of client computing devices and server computers may be supported. For example, users may request for initiating and/or terminating user threads and/or contexts using the client computer devices.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any variety of server applications and/or mid-tier applications, including web servers, Java™ virtual machines, application servers, database servers, and the like. In various embodiments, server computer 710 is adapted to run one or more Web services or software applications described in the foregoing disclosure. For example, server computer 710 may provide the abovementioned graphic user interface and functionalities thereof. In an embodiment, the server computer is compatible with Tuxedo™ system and is able to both locate and process services. For example, the server computer 710 is specifically configured to allow user threads and user contexts.

As shown, client computing devices 702, 704, 706, 708 and server computer 710 are communicatively coupled via network 712. Network 712 may be any type of network that can support data communications using any variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth™ protocol known in the art, and/or any other wireless protocols); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or residing in) one or more of the client computing devices 702, 704, 706, 708, 710. Alternatively, database 714 may be remote from any or all of the client computing devices 702, 704, 706, 708, 710 and/or in communication (e.g., via network 712) with one or more of these. In one set of embodiments, database 714 may reside in a storage-area network (SAN) familiar to those skilled in the art. Similarly, any necessary files for performing the functions attributed to the client computing devices 702, 704, 706, 708, 710 may be stored locally on the respective computer and/or remotely on database 714, as appropriate. In one set of embodiments, database 714 is a relational database, such as Oracle 10g™ available from Oracle Corporation that is adapted to store, update, and retrieve data in response to SQL-formatted commands. In various embodiments, the database 714 stores data in a format that is described in Tables 1 and 2.

Figure 8:
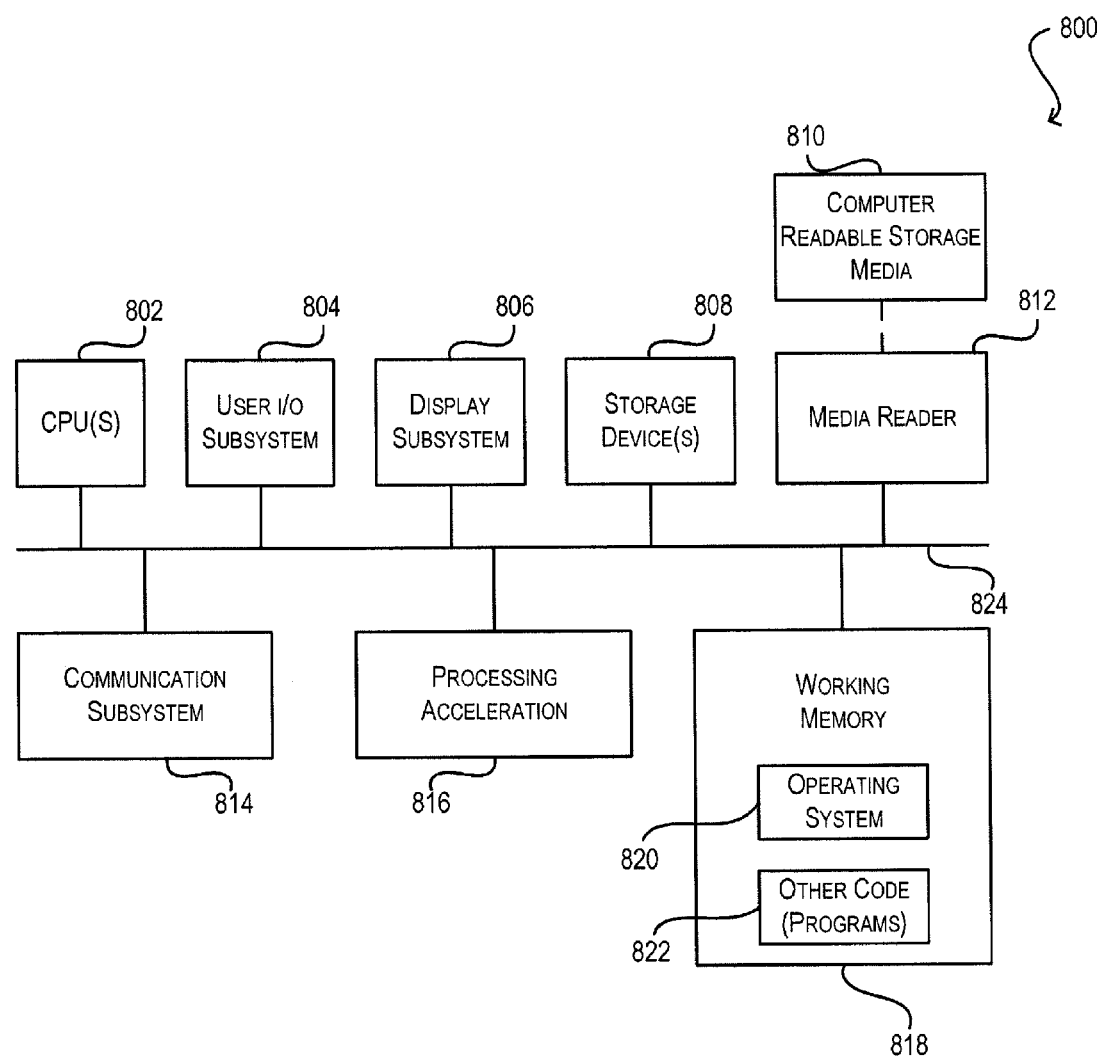
FIG. 8 is a simplified block diagram illustrating physical components of a computer system 800 that may be used in accordance with an embodiment of the present invention.

FIG. 8 is a simplified block diagram illustrating physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the client computing devices 702, 704, 706, 708, 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input device 804 is used to receive user inputs. Computer system 800 may also include one or more storage devices 808. By way of example, storage device(s) 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage device 808. For example, the central processing unit 802 is configured to process service contract information. In addition, a user may use computer system 800 to schedule service contract discovery processes.

Computer system 800 may additionally include a computer-readable storage media reader 812, a communications subsystem 814 (e.g., a modem, a network card (wireless or wired), an infrared communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications subsystem 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable codes and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as Applets™), or both. Further, connection to other computing devices such as network input/output devices may be employed. In various embodiments, the behavior of the zoom functions described throughout the present application is implemented as software elements of the computer system 800.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A non-transitory computer-readable storage medium having sets of instructions stored thereon which, when executed by a computer, cause the computer to:
   receive information from a client entity at a distributed operation platform server entity over a network, wherein the distributed operation platform server entity uses a managed thread pool model and each thread is associated with its own context and stop and start of each thread is managed by a distributed operation platform framework, and wherein the information includes information required by the distributed operation platform server entity to ensure proper execution, wherein the client entity is a multi-context client entity;
   create a plurality of system context for every working thread in the managed thread pool, wherein the multi-context client entity comprises a working thread for each context;
   provide a server process at a service, the server process including one or more process threads which are from the managed thread pool;
   provide a first context from the plurality of system contexts associated with the one or more process threads being managed by the distributed operation platform framework, wherein the context is configured to store the information required by the distributed operation platform server entity to ensure proper execution;
   receive a user request from the client entity for a user thread, the user thread being associated with the service process and a distributed operation platform application;
   generate the user thread at the distributed operation platform server entity;
   allocate memory for a user context at the distributed operation platform server entity;
   associate the user thread to the user context; and
   store the information associated with the user thread in the user context.

2. The non-transitory computer-readable medium of claim 1, wherein the sets of instructions when further executed by the computer, cause the computer to generate an error message if the memory is unavailable for the user context.

3. The non-transitory computer-readable medium of claim 1, wherein the user thread is associated with the server process.

4. The non-transitory computer-readable medium of claim 1, wherein the sets of instructions when further executed by the computer, cause the computer to:
   receive a user request for terminating the user thread;
   terminate the user thread; and
   deallocate the memory for the user context.

5. The non-transitory computer-readable medium of claim 1, wherein the sets of instructions when further executed by the computer, cause the computer to terminate conversations associated with the user thread.

6. The non-transitory computer-readable medium of claim 1, wherein the user request comprises an API call.

7. The non-transitory computer-readable medium of claim 1, wherein the server entity comprises a network interface for receiving the user request from a communication network.

8. The non-transitory computer-readable medium of claim 1, wherein the sets of instructions when further executed by the computer, cause the computer to provide a return value if the user context is generated.

9. A system for providing services, the system comprising:
   a communication network;
   a first client entity, the first client entity being communicatively coupled to the communication network, wherein the client entity is a multi-context client entity;
   a distributed operation platform server entity, wherein the distributed operation platform server entity uses a managed thread pool model and each thread is associated with its own context and stop and start of each thread is managed by a distributed operation platform framework, and wherein the distributed operation platform server entity includes information required by the distributed operation platform server entity to ensure proper execution, the server entity comprising:
      a network interface being communicative coupled to the first entity through the communication network;
      a processor for running at least a server process for the distributed operation platform server entity, the server process having one or more process threads which are from the managed thread pool;
      creating a plurality of system context for every working thread in the managed thread pool, wherein the multi-context client entity comprises a working thread for each context; and
      a memory for storing thread contexts;
   wherein the server entity is configured to:
      receive a user request from the first client entity for a first user thread, the first user thread being associated with the server process and a distributed operation platform application;
      generate the first user thread;
      allocate memory for a first user context from the plurality of system contexts, the first user context being associated with the first user thread being managed by the distributed operation platform framework, wherein the context is configured to store the information required by the distributed operation platform server entity to ensure proper execution;
      associate the first user context to the first user context;
      store information associated with the first user thread at the first user context.

10. The system of claim 9, wherein the memory comprises a buffer memory.

11. The system of claim 9, further comprising a second client entity, wherein the processor is configured to allocate memory to a second user context associate for the second client entity, the second user context being associated with the server process.

12. The system of claim 9, wherein the one or more process threads and the first user thread share the same server process.

13. The system of claim 9, wherein the server entity sends an error message if the memory is unavailable for the first user context.

14. The system of claim 9, wherein the server entity is enabled with user thread and user context functions.

15. A method for providing services, the method comprising:
- receiving information from a client entity at a distributed operation platform server entity over a network, wherein the distributed operation platform server entity uses a managed thread pool model and each thread is associated with its own context and stop and start of each thread is managed by a distributed operation platform framework, and wherein the information includes information required by the distributed operation platform server entity to ensure proper execution, wherein the client entity is a multi-context client entity;
- creating a plurality of system context for every working thread in the managed thread pool, wherein the multi-context client entity comprises a working thread for each context;
- providing a server process at a service, the server process including one or more process threads which are from the managed thread pool;
- providing a first context from the plurality of system contexts associated with the one or more process threads being managed by the distributed operation platform framework, wherein the context is configured to store the information required by the distributed operation platform server entity to ensure proper execution;
- receiving a user request from the client entity for a user thread, the user thread being associated with the service process and a distributed operation platform application;
- generating the user thread at the distributed operation platform server entity;
- allocating memory for a user context at the distributed operation platform server entity;
- associating the user thread to the user context; and
- storing the information associated with the user thread in the user context.

16. The method of claim 15, further comprising generating an error message if the memory is unavailable for the user context.

17. The method of claim 15, wherein the user thread is associated with the server process.

18. The method of claim 15, further comprising:
- receive a user request for terminating the user thread;
- terminate the user thread; and
- deallocate the memory for the user context.

19. The method of claim 15, further comprising terminating conversations associated with the user thread.

20. The method of claim 1, wherein the user request comprises an API call.

* * * * *

UNITED STATES PATENT AND TRADEMARK OFFICE
CERTIFICATE OF CORRECTION

| | | |
|---|---|---|
| PATENT NO. | : 8,380,788 B2 | Page 1 of 1 |
| APPLICATION NO. | : 13/459447 | |
| DATED | : February 19, 2013 | |
| INVENTOR(S) | : Chen et al. | |

It is certified that error appears in the above-identified patent and that said Letters Patent is hereby corrected as shown below:

On the title page, under "Abstract", line 9, delete "associated" and insert -- associated with --, therefor.

In the Specification:

In column 1, line 52, delete "associated" and insert -- associated with --, therefor.

In column 2, line 26, delete "associated" and insert -- associated with --, therefor.

In column 3, line 47, delete "re created" and insert -- re-created --, therefor.

In column 5, line 28, delete "Theses" and insert -- These --, therefor.

In column 6, line 13, delete "nee" and insert -- need --, therefor.

In column 8, line 9, delete "O-length" and insert -- 0-length --, therefor.

In column 9, line 5, delete "buildsever" and insert -- buildserver --, therefor.

In column 10, line 41, delete "asynchrous" and insert -- asynchronous --, therefor.

In column 10, line 44, delete "asynchrous" and insert -- asynchronous --, therefor.

In column 11, line 61, delete "authorizated" and insert -- authorized --, therefor.

Signed and Sealed this
Thirteenth Day of August, 2013

Teresa Stanek Rea
*Acting Director of the United States Patent and Trademark Office*